US007005825B2

(12) United States Patent
Eguchi

(10) Patent No.: US 7,005,825 B2
(45) Date of Patent: Feb. 28, 2006

(54) MOTOR CONTROLLER

(75) Inventor: Kiyoshi Eguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/506,333

(22) PCT Filed: Mar. 12, 2003

(86) PCT No.: PCT/JP03/02921

§ 371 (c)(1),
(2), (4) Date: Sep. 2, 2004

(87) PCT Pub. No.: WO2004/082125

PCT Pub. Date: Sep. 23, 2004

(65) Prior Publication Data

US 2005/0218864 A1 Oct. 6, 2005

(51) Int. Cl.
*H02P 1/24* (2006.01)

(52) U.S. Cl. .................. 318/727; 318/807; 318/809; 318/812; 318/798; 318/799

(58) Field of Classification Search .............. 318/727, 318/798, 799, 805, 807, 809, 812
See application file for complete search history.

(56) References Cited

U.S. PATENT DOCUMENTS

| 5,644,206 | A | * | 7/1997 | Yura | 318/807 |
| 5,821,727 | A | * | 10/1998 | Yura | 318/809 |
| 6,014,007 | A | * | 1/2000 | Seibel et al. | 318/805 |
| 6,703,809 | B1 | * | 3/2004 | Royak et al. | 318/727 |
| 6,809,492 | B1 | * | 10/2004 | Harakawa et al. | 318/609 |
| 6,831,440 | B1 | * | 12/2004 | Royak et al. | 318/727 |

FOREIGN PATENT DOCUMENTS

| JP | 3-3694 A | 1/1991 |
| JP | 7-250496 A | 9/1995 |

* cited by examiner

Primary Examiner—David Martin
Assistant Examiner—Erick Glass
(74) Attorney, Agent, or Firm—Sughrue Mion, PLLC

(57) ABSTRACT

In an electric motor control system according to the present invention, in restarting, after the effect of transient variation has been abated, a phase-reversal-timing detecting means 31 detects the first minimal value V1, the first maximal value V2, and the second maximal value V3, by comparing a value of the integration term of the d-axis component vds* of the 2-phase-voltage command outputted from the d-axis current control means 28 with its previous value, and then outputs a time at which the value of the integration term of the d-axis component vds* of the 2-phase-voltage command becomes below (the first minimal value V2+the second maximal value V3)/2, as the first specific phase at which the current-commanding phase is turned by 180 degrees, to the current phase commanding means 22.

3 Claims, 6 Drawing Sheets

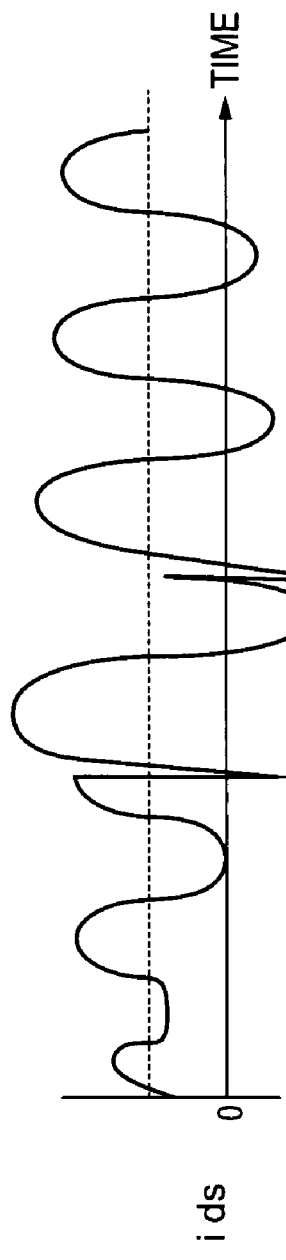
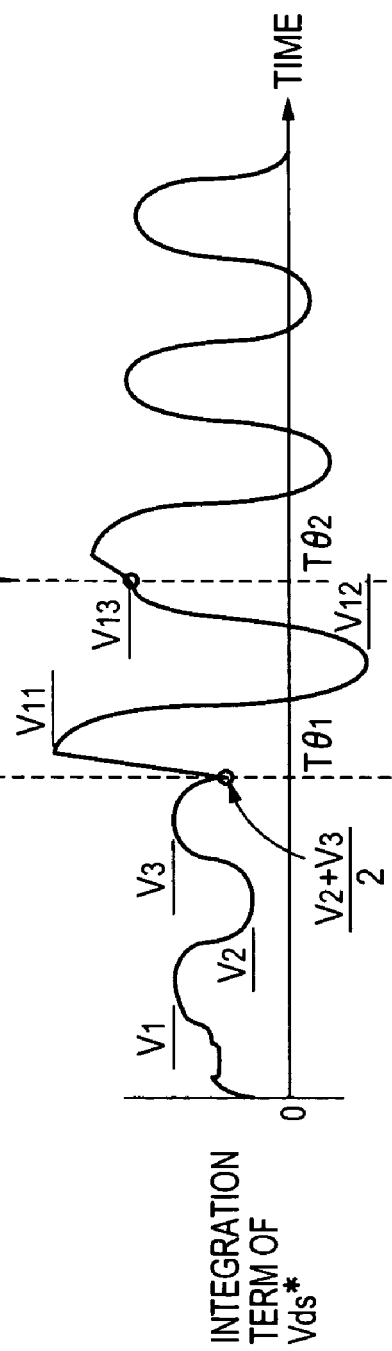
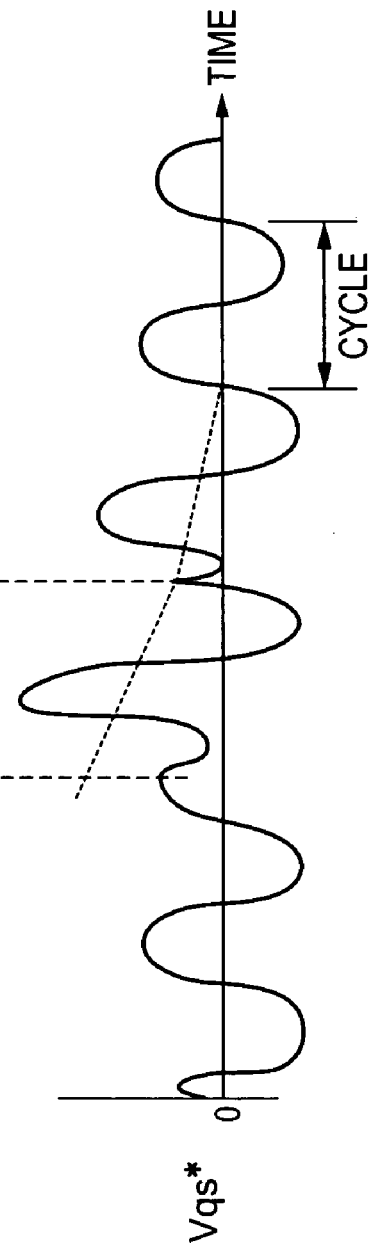

MOTOR CONTROLLER

TECHNICAL FIELD

The present invention relates to electric motor control systems.

BACKGROUND ART

As a velocity controller for induction motors, constant-V/F-control-system inverters that control the ratio of output voltage V to output frequency F to be constant have been widely utilized. With regard to these inverters, when they are restarted, with electric power being restored, after they have been stopped due to the occurrence of instantaneous power failure, or when they are initiated under the circumstances that an induction motor is coasting on external force while the inverter is stopped, it is necessary to re-accelerate the coasting induction motor in such a manner that the rotating frequency F of the induction motor approximately coincides with the output frequency f of the inverter. Accordingly, when the constant-V/F-control-system inverters are initiated, it is necessary to learn the output frequency f of the inverter and the rotating frequency F of the coasting induction motor; therefore, the rotating frequency F has been obtained by providing a velocity detector such as a tachogenerator, or by detecting residual voltage in the induction motor and carrying out calculation base on its frequency components.

Moreover, Japanese Laid-Open Patent Publication 1991-3694 discloses induction motor controllers that realize the object of obtaining the rotating frequency F of a coasting induction motor, without requiring special induction motors equipped with a velocity detector such as a tacho-generator, or dedicated voltage detectors such as a voltage detecting transformer for detecting residual voltage of an induction motor.

Japanese Laid-Open Patent Publication 1991-3694 discloses: when, with an induction motor being coasting, a dc current commanding signal is outputted from a current commanding section, output current from an inverter section is controlled by a control signal system, based on difference between the dc current commanding signal and a detected signal that is a detected value of the output current from the inverter section; in this situation, ripple components are produced in the control signal system; and, by means of extracting the ripple components, the rotating status of the coasting induction motor is learned.

In addition, Japanese Laid-Open Patent Publication 1991-3694 discloses (12th line from the first line in the bottom-right paragraph of page 7): reversing the output-current polarity of an inverter section by reversing the phase angle θ of the current command from 0 degree to 180 degrees in 10 ms after the detection of the rotating status of a coasting induction motor has started, the amplitudes of ripple components that superpose on a voltage command are significantly increased.

What Japanese Laid-Open Patent Publication 1991-3694 discloses utilizes the fact that, because the control signal system undergoes a disturbance accompanied by steep current changes, by reversing the polarity of current inputted to the coasting induction motor, in process of supplying the current, the amplitudes of the superposing ripple components increase. There is inconsistency in ripple amplification utilized for velocity detection, and, in particular, when the frequency is low, the ripple is significantly small; therefore, there has been a problem in that the rotating frequency F of the coasting induction motor cannot be detected with a high degree of accuracy.

The present invention solves the problem discussed above, and its prime object is to detect with a high degree of accuracy the rotating frequency F of the coasting induction motor, regardless of unevenness in the ripple amplification utilized for velocity detection.

DISCLOSURE OF INVENTION

There is provided an electric motor control system including:

a 3-phase/2-phase converting means for converting output current from an inverter section that inverts dc power to ac power into mutually perpendicular 2-phase signals that are a d-axis current component signal and a q-axis current component signal;

a current phase commanding means for outputting, in restarting after an instantaneous power failure being restored, mutually perpendicular 2-phase signals that are the d-axis current component commanding signal and the q-axis current component commanding signal, and a phase angle of the d-axis current component commanding signal and the q-axis current component commanding signal;

a d-axis current control means for amplifying a difference signal of the d-axis current component, the difference signal of the d-axis current component being the difference between the d-axis current component commanding signal and the d-axis current component signal, and for outputting a d-axis component of a 2-phase-voltage command that controls the output current from the inverter section in such a manner that the difference signal is zero;

a q-axis current control means for amplifying a difference signal of the q-axis current component, the difference signal of the q-axis current component being the difference between the q-axis current component commanding signal and the q-axis current component signal, and for outputting a q-axis component of a 2-phase-voltage command that controls the output current from the inverter section in such a manner that the difference signal is zero;

an induction-motor-rotation-status detecting section for receiving the d-axis component of the 2-phase-voltage command outputted from the d-axis current control means, and the q-axis component of the 2-phase-voltage command outputted from the q-axis current control means, and for calculating a rotating frequency and a rotating direction of a coasting induction motor; and a phase-reversal-timing detecting means for detecting as a phase-reversal timing a specific phase at which an amplification factor of ripple components superposed on the d-axis component of the 2-phase voltage command outputted from the d-axis current control means is maximal. Because the current phase commanding means turns a current-commanding phase by 180 degrees according to the specific phase outputted from the phase-reversal-timing detecting means, the rotating frequency F of the coasting induction motor can be detected with a high degree of accuracy.

In restarting after an instantaneous power failure being restored, after the current control has been started and the effect of transient variation has been abated, the phase-reversal-timing detecting means detects a first maximal value, a first minimal value, and a second maximal value by comparing a value of the integration term of the d-axis component of the 2-phase-voltage command outputted from the d-axis current control means with its previous value, and then outputs a time at which the integration-term value of the d-axis component of the 2-phase-voltage command becomes below (the first minimal value1+the second maximal value)/2, as a first specific phase at which the current-commanding phase is turned by 180 degrees, to the current phase commanding means; therefore, the specific phase T$\theta$1 can be detected without being affected by the rotating direction of a coasting induction motor.

After outputting the first specific phase, the phase-reversal-timing detecting means detects a first maximal value, a first minimal value, and a second maximal value by comparing a value of the integration term of the d-axis component of the 2-phase-voltage command outputted from the d-axis current control means with its previous value, and then outputs a time at which the integration-term value of the d-axis component of the 2-phase-voltage command has become the second maximal value, as a second specific phase at which the current-commanding phase is turned by 180 degrees, to the current phase commanding means; therefore, the center line of the waveform of the q-axis component vqs* of the 2-phase-voltage command oscillates with respect to the zero axis; thus, the ripple frequency fn can be precisely calculated even when the residual voltage remains large.

BRIEF DESCRIPTION OF DRAWINGS

FIGS. 6a thru 6c are graphs representing various waveforms according to Embodiment 2 of the present invention, the various waveforms relating to the calculation of specific phases T$\theta$1 and T$\theta$2 at which the ripple amplification factors are maximal in cases where large residual voltage remains.

BEST MODE FOR CARRYING OUT THE INVENTION

Embodiment 1.

Figure 1:
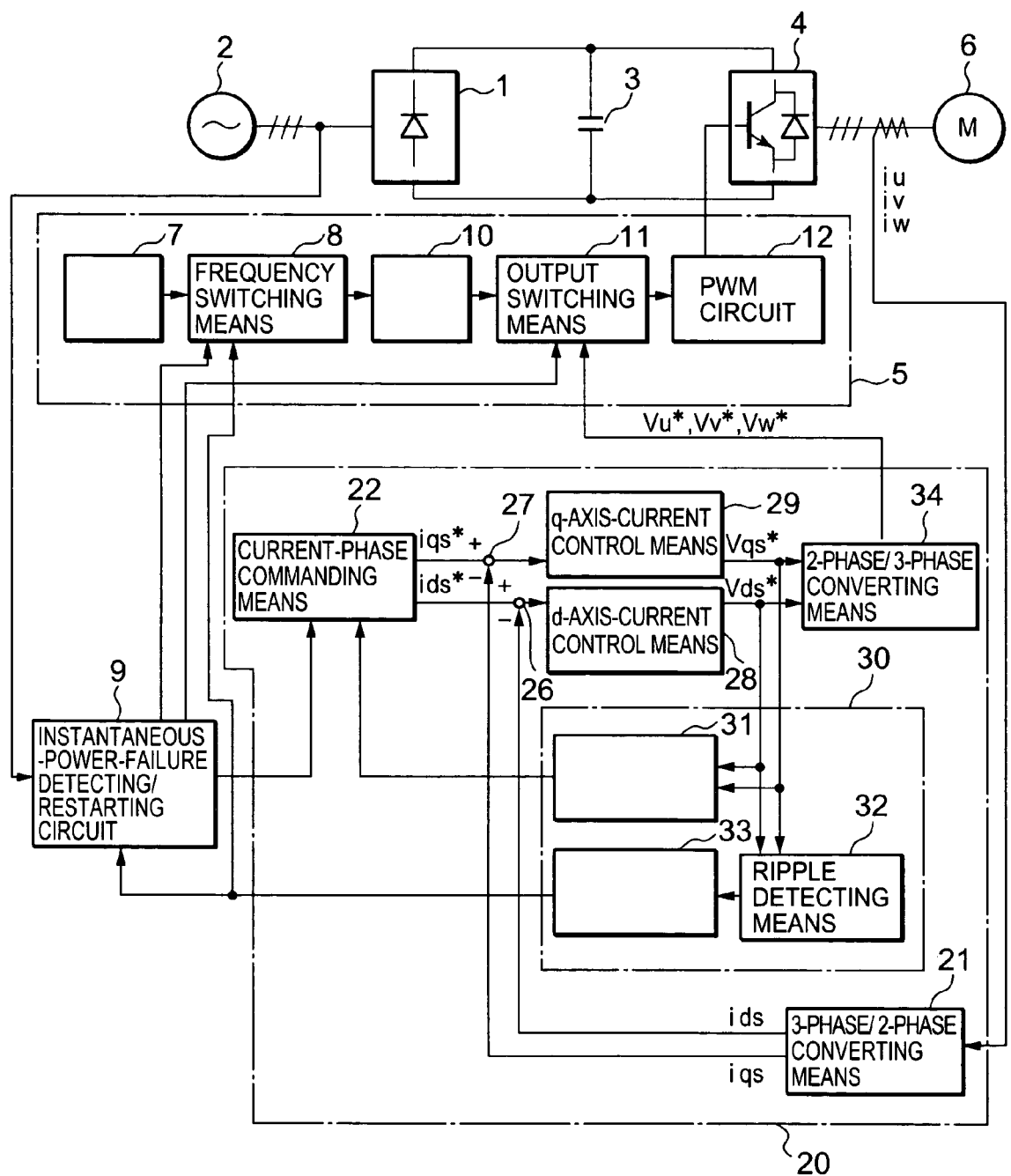
FIG. 1 is a view illustrating the configuration of an electric control system according to Embodiment 1 of the present invention.

The configuration and the operation of an electric motor control system according to Embodiment 1 of the present invention will be discussed referring to FIG. 1. In FIG. 1, a rectifier circuit 1 converts 3-phase ac (alternating current) inputted from a 3-phase commercial power source 2 to dc (direct current), and the converted dc is smoothed by a main circuit capacitor 3. An inverter section 4 is constituted from a switching element such as a transistor, and a feedback diode connected in parallel with the switching element; control signals from control circuitry 5 on-off control the switching element so that dc power is inverted into variable-frequency and variable-voltage ac power; and thereby an induction motor 6 is variable-speed driven.

In cases where the induction motor 6 that has been in a standstill is restarted, an acceleration/deceleration commanding device 7 sets an output frequency f as rotating velocity of the induction motor, and then 3-phase commercial power source 2 is turned on. A frequency switching means 8 allows an output signal, either from the acceleration/deceleration commanding device 7 or from an induction-motor-rotation-status detecting section 30 described later, to pass, and is ordinarily set over to the acceleration/deceleration commanding device 7 by a command signal from an instantaneous-power-failure detecting/restarting circuit 9. A voltage/frequency converting means 10 outputs a voltage command V so that the ratio of voltage to output frequency that is set by the acceleration/deceleration commanding device 7 is constant. An output switching means 11 allows an output signal, either from the voltage/frequency converting means 10 or from a 2-phase/3-phase converting means 34 described later, to pass, and is ordinarily set over to the acceleration/deceleration commanding device 10 by a command signal from the instantaneous-power-failure detecting/restarting circuit 9. In addition, after detecting an instantaneous power failure of the commercial power source 2, the instantaneous-power-failure detecting/restarting circuit 9 outputs a command signal to an induction-motor-restart calculating section 20 described later, in order to detect the rotating status of a coasting induction motor.

A PWM circuit 12 gradually accelerates over a predetermined time the induction motor 6 from zero to predetermined rotating velocity, by producing a PWM signal based on the voltage command V and on-off controlling the switching element in the inverter section 4, and by inverting dc power to variable-frequency and variable-voltage ac power.

Next, when the induction motor is restarted, with electric power being restored, after the electric motor control system has been stopped due to the occurrence of instantaneous power failure, or when the induction motor is initiated under the circumstances that it is coasting on external force while the electric motor control system is stopped, the induction-motor-restart calculating section 20 detects the rotating status of the coasting induction motor, the induction-motor-restart calculating section 20 being constituted from a 3-phase/2-phase converting means 21, a current-phase commanding means 22, a d-axis-current comparison means 26, a q-axis-current comparison means 27, a d-axis-current control means 28, a q-axis-current control means 29, the induction-motor-rotation-status detecting section 30, and the 2-phase/3-phase converting means 34. The frequency switching means 8 is set over to the induction-motor-rotation-status detecting section 30 by a command signal from the instantaneous-power-failure detecting/restarting circuit 9, and the voltage/frequency converting means 10 outputs a voltage command V so that the ratio of voltage to rotating frequency F is constant, based on the rotating frequency F that is outputted by the induction-motor-rotation-status detecting section 30. The output switching means 11 is set over to the 2-phase/3-phase converting means 34 by a command signal from the instantaneous-power-failure detecting/restarting circuit 9 and allows an output signal from the 2-phase/3-phase converting means 34 to pass, while the induction-motor-rotation-status detecting section 30 calculates the rotating status of the coasting induction motor; and after the rotating status of the coasting induction motor has been detected, the output switching means 11 is set over to the voltage/frequency converting means 10 and outputs a voltage command V corresponding to the detected rotating frequency F. The PWM circuit 12 restarts the induction motor 6 from the detected rotating frequency F of the coasting induction motor, by producing a PWM signal based on the voltage command V; by on-off controlling the switching element in the inverter section 4; and by inverting dc power to ac power.

Detecting and processing the rotating status of the coasting induction motor will be discussed below.

In the first place, the 3-phase/2-phase converting means 21 converts output currents iu, iv, and iw from the inverter section, which are detected by a current detecting section 13, into 2-phase-current ids (d-axis component) and iqs (q-axis component). When a command signal from the instantaneous-power-failure detecting/restarting circuit 9 is inputted, the current-phase commanding means 22 outputs 2-phase-current commands ids* and iqs*, and a phase angle θ of the 2-phase-current commands ids* and iqs*. The d-axis-current comparison means 26 compares the d-axis component ids* of the 2-phase-current command that the current-phase commanding means 22 outputs with the d-axis component ids of the 2-phase current that the 3-phase/2-phase converting means 21 outputs, and then outputs the difference signal (ids*−ids). The q-axis-current comparison means 27 compares the q-axis component iqs* of the 2-phase-current command that the current-phase commanding means 22 outputs with the q-axis component iqs of the 2-phase current that the 3-phase/2-phase converting means 21 outputs, and then outputs the difference signal (iqs*−iqs).

The d-axis-current control means 28 receives and amplifies the difference signal from the d-axis-current comparison means 26, and outputs the d-axis component vds* of the 2-phase-voltage command for controlling the output current from the inverter section in such a manner that the difference signal is zero. The q-axis-current control means 29 receives and amplifies the difference signal from the q-axis-current comparison means 27, and outputs the q-axis component vqs* of the 2-phase-voltage command for controlling the output current from the inverter section in such a manner that the difference signal is zero.

The induction-motor-rotation-status detecting section 30 includes: a phase-reversal-timing detecting means 31 that detects phase-reversal timing based on the d-axis component vds* of the 2-phase-voltage command outputted from the d-axis-current control means 28; a ripple detecting means 32 that receives the d-axis component vds* and the q-axis component vqs*, of the 2-phase-voltage command, outputted from the d-axis-current control means 28 and the q-axis-current control means 29, respectively, and detects ripple components that are superposed on the d-axis component vds* and the q-axis component vqs*, of the 2-phase-voltage command; and a rotating-frequency/direction calculating means 33 that calculates, based on the detected ripple components, the rotating frequency and rotating direction of the coasting induction motor. The induction-motor-rotation-status detecting section 30 turns the phase of the current command by 180 degrees at a specific phase at which the ripple-component amplification factor is maximal, and calculates the rotating frequency F and rotating direction of the coasting induction motor. In addition, the 2-phase/3-phase converting means 34 receives the d-axis component vds* and the q-axis component vqs*, of the 2-phase-voltage command, outputted from the d-axis-current control means 28 and the q-axis-current control means 29, respectively, and converts them into 3-phase-voltage commands vu*, vv*, and vw*.

Figure 2A:
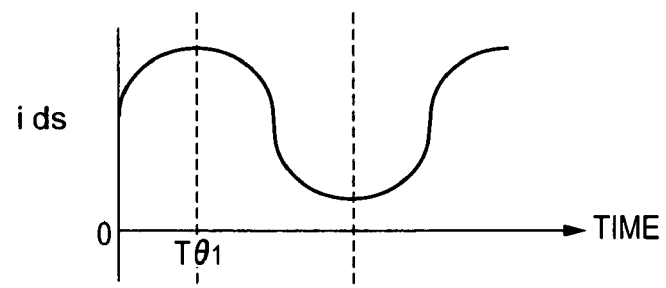
FIGS. 2a and 2b are graphs representing the relationship between the d-axis component ids of 2-phase current that a 3-phase/2-phase converting means 21 outputs and the ripple amplification factor.
Figure 2B:
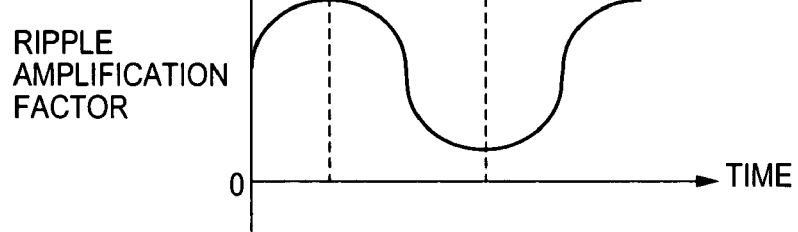
Figure 3A:
FIGS. 3a thru 3d are graphs representing various waveforms according to Embodiment 1 of the present invention, the various waveforms relating to the calculation of a specific phase TO1 at which the ripple amplification factor is maximal.
Figure 3B:
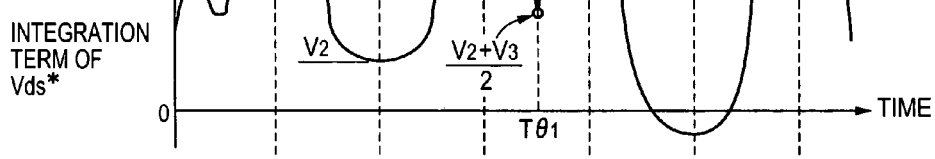
Figure 3C:
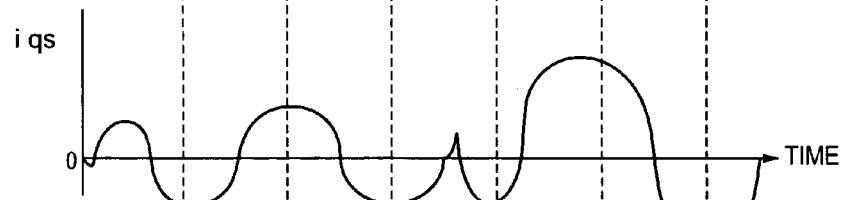
Figure 3D:
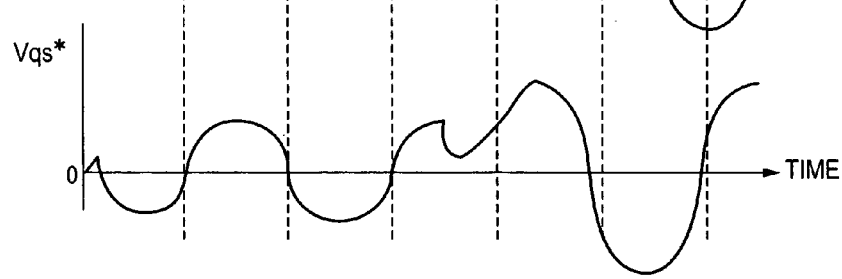

In FIG. 2, at (a) is a waveform of the d-axis component ids of 2-phase current that the 3-phase/2-phase converting means 21 outputs, and at (b) is a waveform of the ripple amplification factor that is the ratio of the ripple amplitude after the 180-degree phase reversal to the ripple amplitude before the 180-degree phase reversal. As represented in FIG. 2, the ripple factor is maximal at timing Tθ1 when the d-axis component ids of 2-phase current is maximal.

Calculating the specific phase at which the ripple amplification factor is maximal will be discussed referring to FIG. 3 In FIG. 3, at (a) is a waveform of the d-axis component ids of the 2-phase current that the 3-phase/2-phase converting means outputs; at (b) is a waveform of the integration term of the d-axis component vds* of the 2-phase-voltage command; at (c) is a waveform of the q-axis component iqs of the 2-phase current that the 3-phase/2-phase converting means outputs; and at (d) is a waveform of the q-axis component vqs* of the 2-phase-voltage command. As represented in FIG. 3, the phase of the d-axis component vds* of the 2-phase voltage command is 90-degrees before that of the d-axis component ids of the 2-phase current.

The specific phase Tθ1, at which the ripple amplification factor is maximal, corresponds to the timing when the d-axis component ids of 2-phase current is maximal; in detecting the Tθ1, the phase-reversal-timing detecting means 31 calculates it in the following manner, utilizing the integration term, which is readily detected without being affected by a rotating direction, of the d-axis component vds* of the 2-phase-voltage command.

With the induction motor being initiated, in several milliseconds after the effect of transient variation has been abated, by comparing a value of the integration term of the d-axis component vds* of the 2-phase-voltage command outputted from the d-axis-current control means 28 with its previous value, the phase-reversal time Tθ1 as the specific phase, at which the ripple amplification factor is maximal, is calculated.

(1) The point when the previous value of the integration term of the d-axis component vds* of the 2-phase-voltage command has become larger than the present value is taken to be the first maximal value V1.

(2) Then, the point when the previous value of the integration term of the d-axis component vds* of the 2-phase-voltage command has become smaller than the present value is taken to be the first minimal value V2.

(3) Following detection of V2, the point when the previous value of the integration term of the d-axis component vds* of the 2-phase-voltage command has become larger than the present value is taken to be the second maximal value V3.

(4) The time Tθ1 at which, following detection of V3, the value of the integration term of the d-axis component vds* of the 2-phase-voltage command has become under (V2+V3)/2 is taken to be the phase-reversal specific phase.

The reason why the ripple increases at this position is that the control system becomes more unstable because the abrupt change in the integration term of the d-axis component vds* of the 2-phase-voltage command gives a large disturbance to the control system.

Figure 4:
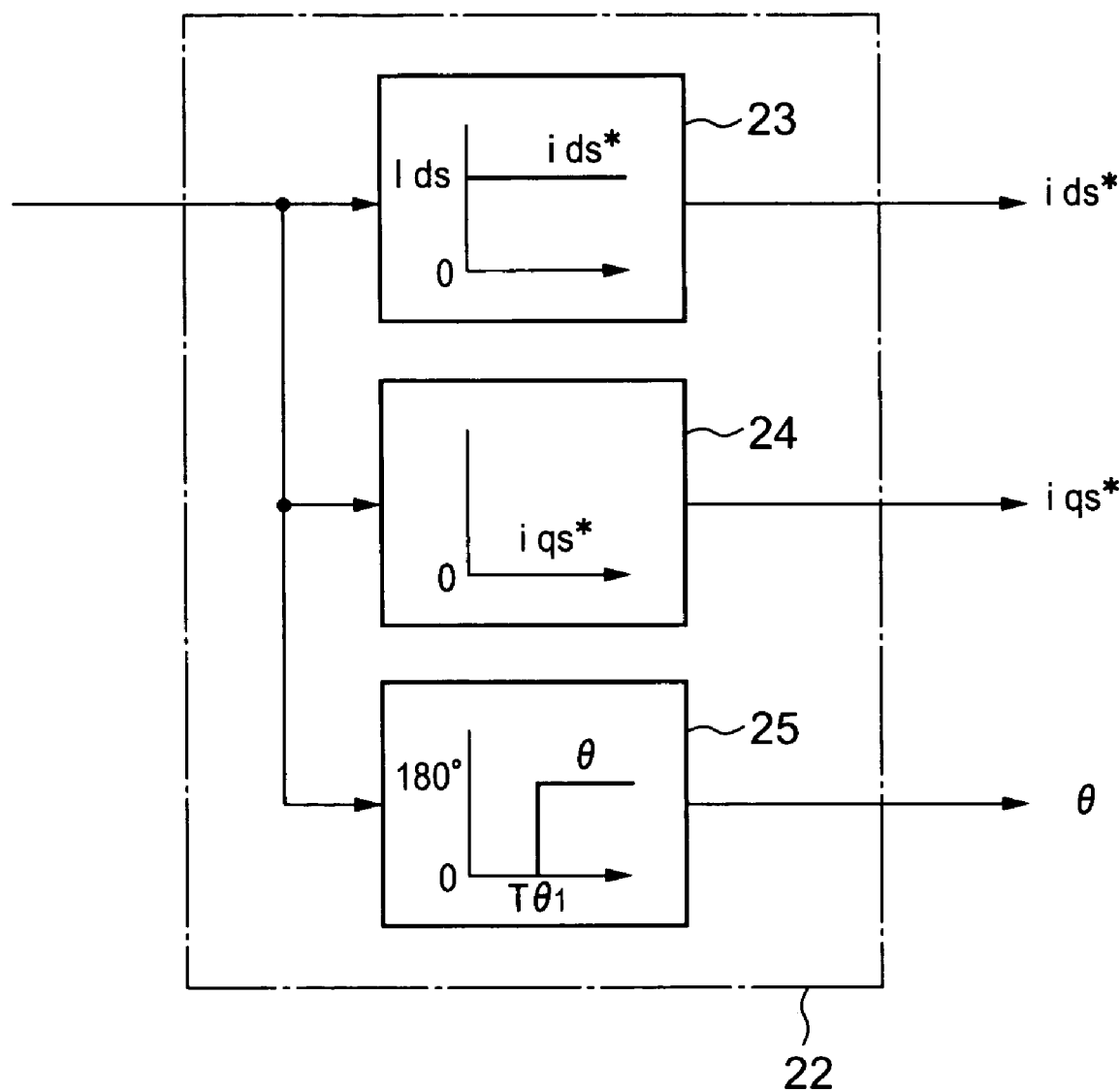
FIG. 4 is a view illustrating the configuration of a current-phase commanding means 22 in an-induction-motor-restart calculating section 20 according to Embodiment 1 of the present invention.

Next, the operation of the current-phase commanding means 22 to reverse at Tθ1 the phase will be discussed referring to FIG. 4. In FIG. 4, the current-phase commanding means 22 is constituted from a d-axis-current commanding means 23, a q-axis-current commanding means 24, and a phase-angle generating means 25, and outputs the following commands when a command from the instantaneous-power-failure detecting/restarting circuit 9 is inputted:

(1) t<Tθ1

$$ids^* = Ids \text{ (fixed value)}$$

$$iqs^* = 0$$

$$\theta = 0$$

(2) t>Tθ1

$$ids^* = Ids \text{ (fixed value)}$$

$$iqs^* = 0$$

$$\theta = 180°$$

where ids* and iqs* are 2-phase-current commands, and θ is a phase angle of the 2-phase-current commands ids* and iqs*; and Tθ1 is the time at which the ripple amplification factor, which is calculated by the phase-reversal-timing detecting means 31, is maximal.

As discussed above, in the electric motor control system according to Embodiment 1, turning the current-command phase by 180 degrees is carried out not at a fixed time, but at a specific phase at which the amplification factor of the ripple components is maximal; therefore, the rotating frequency F of the coasting induction motor can be detected with a high degree of accuracy.

In addition, the specific phase Tθ1, at which the amplification factor of ripple components is maximal, is detected by utilizing the integration term of the d-axis component vds* of the 2-phase-voltage command; therefore, the specific phase Tθ1 can be detected without being affected by the rotating direction of the coasting induction motor.

Embodiment 2.

Figure 5A:
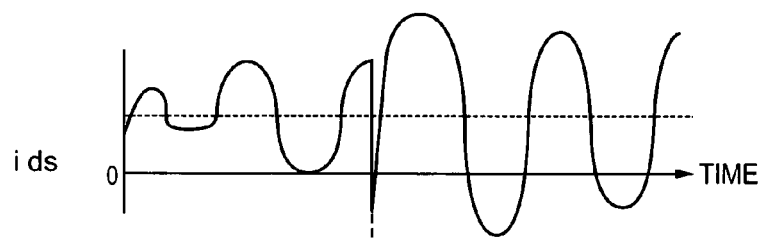
FIGS. 5a thru 5c are graphs representing various waveforms that relate to the calculation of a specific phase TO1 at which the ripple amplification factor is maximal in cases where large residual voltage remains.
Figure 5B:
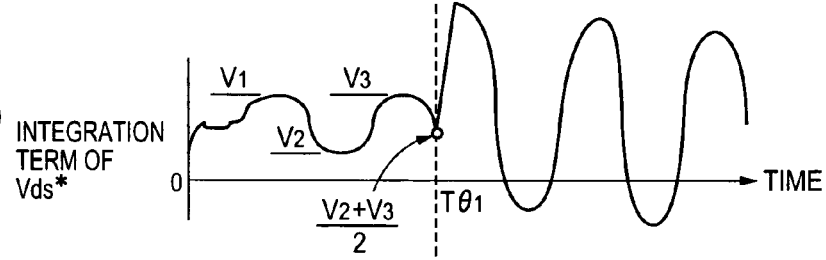
Figure 5C:
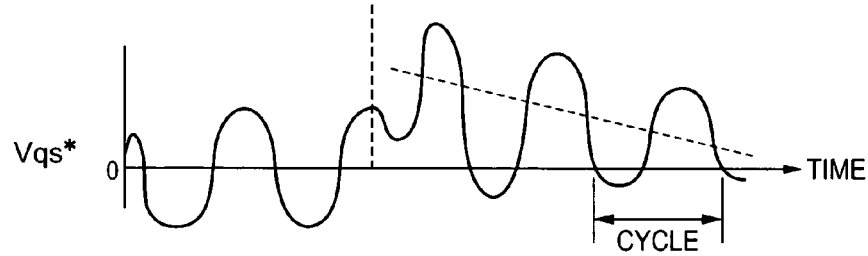

In FIG. 5, at (a) is a waveform of the d-axis component ids of the 2-phase current that the 3-phase/2-phase converting means outputs; at (b) is a waveform of the integration term of the d-axis component vds* of the 2-phase-voltage command; and at (c) is a waveform of the q-axis component vqs* of the 2-phase-voltage command:

As represented in FIG. 5(b), when the phase is turned by 180 degrees at Tθ1 (the timing at which the integration term of vqs* has become below (V2+V3)/2) while the residual voltage remains large, the center line of the waveform of the q-axis component vqs* of the 2-phase-voltage command becomes off the zero axis, as represented in FIG. 5(c), because the ripple becomes too large.

The rotating status (rotating frequency F and rotating direction) of a coasting induction motor is calculated based on the frequency fn of the ripple that superposes on the d-axis component vds* and the q-axis component vqs*, of the 2-phase-voltage command.

If "iqs*=0" is given as a current command, the q-axis component vqs* of the 2-phase voltage command is of only an ac ripple whose average value is zero; therefore, in general, the ripple frequency fn is obtained based on the q-axis component vqs* of the 2-phase-voltage command.

For this reason, as represented in FIG. 5(c), when the center line of the waveform of the q-axis component vqs* of the 2-phase-voltage command becomes off the zero axis, the ripple frequency fn cannot be precisely calculated.

In Embodiment 2, when the phase has been reversed by 180 degrees at the time Tθ1 while the residual voltage remains large, and the ripple has become too large, the phase is secondarily reversed by 180 degrees at the time Tθ2.

The operation of secondarily reversing the phase by 180 degrees at the time Tθ2 will be discussed referring to FIG. 6. In FIG. 6, at (a) is a waveform of the d-axis component ids of the 2-phase current that the 3-phase/2-phase converting means outputs; at (b) is a waveform of the integration term of the d-axis component vds* of the 2-phase voltage command; and at (c) is a waveform of the q-axis component vqs* of the 2-phase-voltage command.

The phase-reversal-timing detecting means 31 identifies the waveform of the q-axis component vqs* of the 2-phase-voltage command outputted from the q-axis-current control means 29; the current-phase commanding means 22 implements reversing processing at the time Tθ1 (the timing at which the integration term of vqs* has become below (V2+V3)/2) calculated in such a manner as Embodiment 1; and then, in consideration of the case where, as represented in FIG. 6(b), the ripple becomes large, and as represented in FIG. 6(c), the center line of the waveform of the q-axis component vqs* of the 2-phase voltage command becomes off the zero axis, the phase-reversal-timing detecting means 31 calculates the time Tθ2 as the secondary specific phase at which the phase reverses.

(1) The values of the integration term of the d-axis component vds* of the 2-phase-voltage command are compared between a previous value and a present value; the point at which the value of the previous integration term of the d-axis component vds* of the 2-phase-voltage command has become larger than the present value is taken to be the first maximal value V11 of the second times.

(2) Thereafter, the point at which the value of the previous integration term of the d-axis component vds* of the 2-phase-voltage command has become smaller than the present value is taken to be the first minimal value V12 of the second times.

(3) The point at which, following detection of V12, the previous value of the integration term of the d-axis component vds* of the 2-phase-voltage command has become larger than the present value is taken to be the second maximal value V13 of the second times; and the time Tθ2, at which the value of the integration term of the d-axis component vds* of the 2-phase-voltage command has become V13 is taken to be the secondary phase-reversal timing.

Next, the current-phase commanding means 22 carries out at Tθ2 the secondary phase reversal.

As discussed above, in the electric motor control system according to Embodiment 2, even if the residual voltage remains large, because the second 180 degree turn is set to the time Tθ2, the center line of the waveform of the q-axis component vqs* of the 2-phase-voltage command oscillates with respect to the zero axis; therefore, the ripple frequency fn can be precisely calculated even when the residual voltage remains large.

INDUSTRIAL APPLICABILITY

As described above, the electric motor control systems according to the present invention can detect with a high degree of accuracy the rotating status (rotating frequency F and rotating direction) of a coasting induction motor; therefore, they are suitable for applications in which an induction motor as a load coasts even when the power supply is cut off.

Because this invention may be embodied in several forms without departing from the spirit of the essential characteristics thereof, the present embodiments are therefore illustrative and not restrictive, since the scope of the invention is defined by the appended claims rather than by the description preceding them, and all chances that fall within the metes and bounds of the claims, or the equivalence of such metes and bounds, are therefore intended to be embraced by the claims.

What is claimed is:

1. An electric motor control system comprising:

a 3-phase/2-phase converting means for converting output current from an inverter section that inverts dc power to ac power into mutually perpendicular 2-phase signals that are a d-axis current component signal and a q-axis current component signal;

a current phase commanding means for outputting, in restarting after an instantaneous power failure being restored, mutually perpendicular 2-phase signals that are the d-axis current component commanding signal and the q-axis current component commanding signal, and phase angles of the d-axis current component commanding signal and the q-axis current component commanding signal;

a d-axis current control means for amplifying a difference signal of the d-axis current component, the difference signal of the d-axis current component being the difference between the d-axis current component commanding signal and the d-axis current component signal, and for outputting a d-axis component of a 2-phase-voltage command that controls output current from the inverter section in such a manner that the difference signal is zero;

a q-axis current control means for amplifying a difference signal of the q-axis current component, the difference signal of the q-axis current component being the difference between the q-axis current component commanding signal and the q-axis current component signal, and for outputting a q-axis component of a 2-phase-voltage command that controls output current from the inverter section in such a manner that the difference signal is zero;

an induction-motor-rotation-status detecting section for receiving the d-axis component of the 2-phase-voltage command outputted from the d-axis current control means, and the q-axis component of the 2-phase-voltage command outputted from the q-axis current control means, and for calculating a rotating frequency and a rotating direction of a coasting induction motor; and a phase-reversal-timing detecting means for detecting as a phase-reversal timing a specific phase at which an amplification factor of ripple components superposed on the d-axis component of the 2-phase-voltage command outputted from the d-axis current control means is maximal, the current phase commanding means turning each phase of the d-axis and q-axis current component commanding signals by 180 degrees according to the specific phase outputted from the phase-reversal-timing detecting means.

2. An electric motor control system according to claim 1, wherein, in restarting after an instantaneous power failure being restored, after the current control has been started and the effect of transient variation has been abated, the phase-reversal-timing detecting means detects a first maximal value, a first minimal value, and a second maximal value by comparing a value of the integration term of the d-axis component of the 2-phase-voltage command outputted from the d-axis current control means with its previous value, and then outputs a time at which the value of the integration term of the d-axis component of the 2-phase-voltage command becomes below (the first minimal value1+the second maximal value) /2, as a first specific phase at which the current-commanding phase is turned by 180 degrees, to the current phase commanding means.

3. An electric motor control system according to claim 2, wherein, after outputting the first specific phase, the phase-reversal-timing detecting means detects a first maximal value, a first minimal value, and a second maximal value by comparing a value of the integration term of the d-axis component of the 2-phase-voltage command outputted from the d-axis current control means with its previous value, and then outputs a time at which the value of the integration term of the d-axis component of the 2-phase-voltage command has become the second maximal value, as a second specific phase at which the current-commanding phase is turned by 180 degrees, to the current phase commanding means.

* * * * *